(12) United States Patent
Kuwata et al.

(10) Patent No.: US 7,609,398 B2
(45) Date of Patent: Oct. 27, 2009

(54) SYSTEM AND METHOD FOR RENDERING FONTS FOR TABBED PAPER STOCK ON A NETWORK

(75) Inventors: Katie Kuwata, Oceanside, CA (US); Truc Nguyen, San Diego, CA (US); William Su, Riverside, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 1224 days.

(21) Appl. No.: 10/675,136

(22) Filed: Sep. 30, 2003

(65) Prior Publication Data

US 2005/0080839 A1 Apr. 14, 2005

(51) Int. Cl.
- G06K 15/02 (2006.01)
- G06F 3/12 (2006.01)
- H04N 1/387 (2006.01)
- G06T 11/00 (2006.01)
- G06T 1/60 (2006.01)

(52) U.S. Cl. .................. 358/1.11; 358/1.15; 358/1.1
(58) Field of Classification Search .................. 101/482
See application file for complete search history.

(56) References Cited

U.S. PATENT DOCUMENTS

| 5,206,736 | A | | 4/1993 | Simpson |
| 5,533,174 | A | | 7/1996 | Flowers, Jr. et al. |
| 5,721,812 | A | | 2/1998 | Mochizuki |
| 5,781,714 | A | * | 7/1998 | Collins et al. ............... 345/471 |
| 5,805,783 | A | | 9/1998 | Ellson et al. |
| 6,055,061 | A | | 4/2000 | Sato |
| 6,073,147 | A | * | 6/2000 | Chan et al. ................... 715/234 |
| 6,519,630 | B1 | | 2/2003 | Hanawa |
| 6,522,330 | B2 | | 2/2003 | Kobayashi |
| 7,010,587 | B1 | * | 3/2006 | Shiimori ..................... 709/223 |
| 7,548,325 | B2 | * | 6/2009 | Quach et al. ............... 358/1.11 |
| 2001/0019329 | A1 | | 9/2001 | Kobayashi |
| 2001/0046059 | A1 | * | 11/2001 | Motamed et al. .......... 358/1.12 |
| 2001/0052901 | A1 | | 12/2001 | Kawabata et al. |
| 2002/0136578 | A1 | | 9/2002 | Johnson et al. |
| 2003/0222916 | A1 | * | 12/2003 | Kuwata et al. .............. 345/777 |
| 2004/0019848 | A1 | * | 1/2004 | Nguyen et al. ............. 715/513 |
| 2006/0095838 | A1 | * | 5/2006 | Nguyen et al. ............. 715/522 |
| 2006/0164665 | A1 | * | 7/2006 | Park .......................... 358/1.11 |
| 2008/0046835 | A1 | * | 2/2008 | Nguyen et al. ............. 715/777 |

FOREIGN PATENT DOCUMENTS

JP 61097739 A * 5/1986

* cited by examiner

*Primary Examiner*—Twyler L Haskins
*Assistant Examiner*—Myles D Robinson
(74) *Attorney, Agent, or Firm*—Tucker Ellis & West LLP

(57) ABSTRACT

This invention is directed to a system and method for storing font image data, which is already rendered, in a history-based order on the server side. This avoids the server side processing time to render the font every time a request is received. This allows users to use many server side fonts that users may not have on their client workstations. In the method, the user uses a web browser to choose a font type, size, and style from a list of available fonts installed on the server. The system then determines if the selected font exists in the font repository. If the font exists, the system retrieves the font images from the font repository. If the font does not exist, the system creates the font images and stores the font images to the font repository.

14 Claims, 4 Drawing Sheets

SYSTEM AND METHOD FOR RENDERING FONTS FOR TABBED PAPER STOCK ON A NETWORK

BACKGROUND OF THE INVENTION

This invention is directed to a system and method for rendering fonts on a network. More particularly, this invention is directed to a system and method for storing font image data, which is already rendered, in a history-based order on the server side.

Web-based applications are accessed by client users from web browsers from many different choices of client operating systems, such as Windows, Linux, Unix, and Macintosh. These client operating systems may not have any fonts or any desirable fonts in a desirable language and is especially true in a Linux or Unix system. In a typical web server application, the user sends requests and data from a web browser to the application on the web server. The web-based application responds to the request and sends data back to user through the web browser.

Storing fonts and retrieving the data on the server side allows a user to use different kinds of typefaces, different sizes, and different languages of fonts that may not exist in the user's client system. All users, even if the users are using different operating system and browsers, receive the same results. However, retrieving font data on the server side requires much processing time. There is a significant problem if the font is an outline font in which the shape or outline of each character is defined in vector or curves. Every character of the outline font must be generated as needed which is a computer intensive process.

There is a need for a system and method for rendering fonts on a network which overcomes these problems.

SUMMARY OF THE INVENTION

In accordance with the present invention, there is provided a system and method for rendering fonts on a network.

Further, in accordance with the present invention, there is provided a system and method for storing font image data, which is already rendered, in a history-based order on the server side.

Further, in accordance with the present invention, there is provided a system and method for rendering fonts on a network which decrease the time processing time of the server to render the font every time a request is received.

Still further, in accordance with present invention, there is provided a network font rendering system comprising means adapted for acquiring vector data representative of a vector based font, rendering means adapted for rendering at least a portion of the vector based font to generate font images corresponding thereto, and font storage means adapted for storing the font images on a networked memory. The system also comprises means adapted for receiving a font request from at least one networked workstation and communication means adapted for selectively communicating the font images to generate document print data in accordance with a request from the at least one networked workstation.

In one embodiment, the font images are communicated to the at least one networked workstation. In another embodiment, the font images are communicated to an associated printing device.

Still further, in accordance with the present invention, there is provided a method for rendering fonts on a network system comprising the steps of comprising the steps of acquiring vector data representative of a vector based font, rendering at least a portion of the vector based font to generate font images corresponding thereto, and storing the font images on a networked memory. The method further includes the steps of receiving a font request from at least one networked workstation and selectively communicating the font images to generate document.

In one embodiment, the font images are communicated to the at least one networked workstation. In another embodiment, the font images are communicated to an associated printing device.

These and other aspects, features, and advantages of the present invention will be understood by one skilled in the art upon reading and understanding the specification.

DETAILED DESCRIPTION OF THE PREFERRED EMBODIMENTS

This invention is directed to a system and method for storing font image data, which is already rendered, in a history-based order on the server side. This avoids the server side processing time to render the font every time a request is received. This allows users to use many server side fonts that users may not have on their client workstations. In the method, the user uses a web browser to choose a font type, size, and style from a list of available fonts installed on the server. The system then determines if the selected font exists in the font repository. If the font exists, the system retrieves the font images from the font repository. If the font does not exist, the system creates the font images and stores the font images to the font repository.

Figure 1:
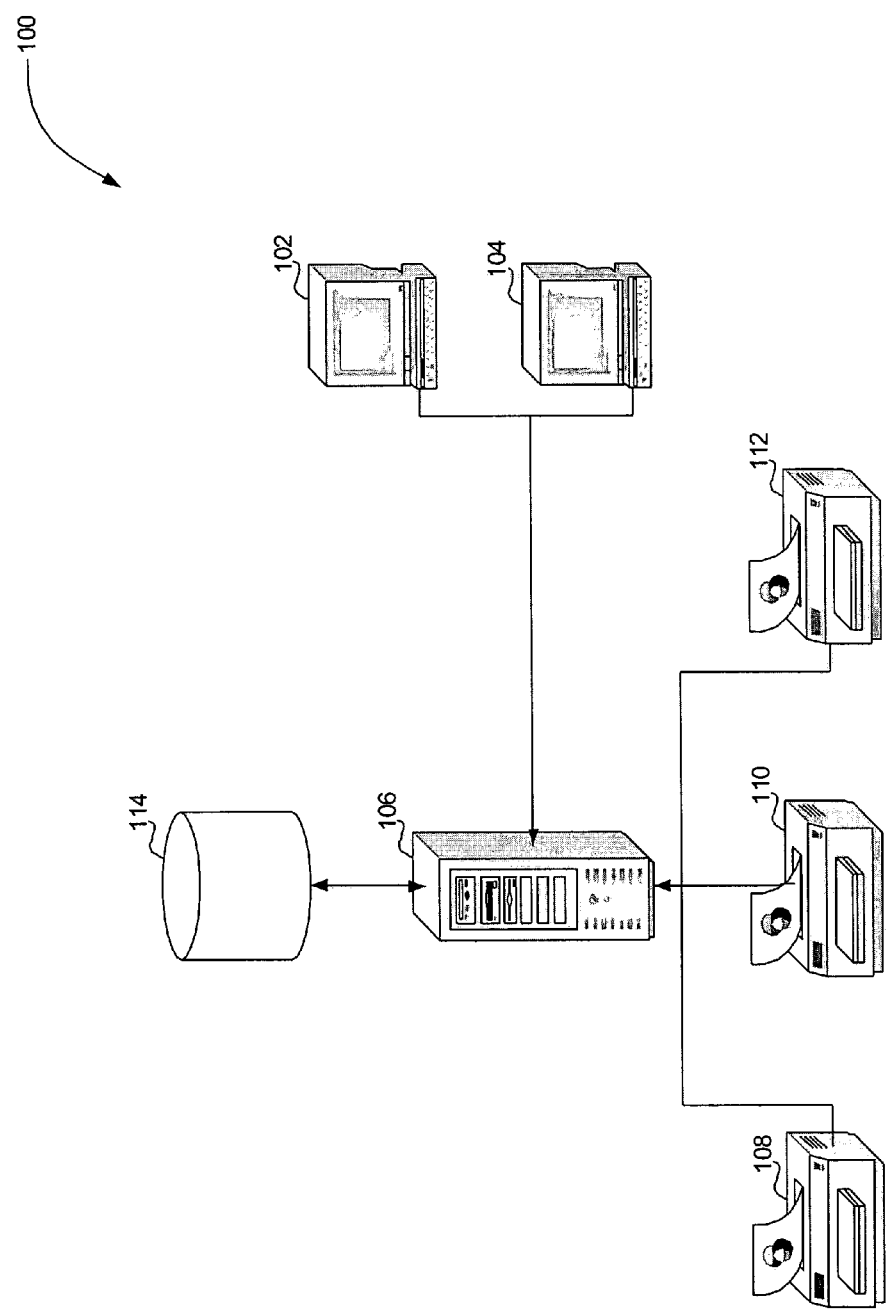
FIG. 1 is a block diagram depicting an exemplary network for the method and implementation of the present invention.

An exemplary network 100 is shown in FIG. 1 for deploying the method and implementation of the present invention. One or more client machines, as illustrated by machines 102 and 104, send requests which are received and responded to by controller/server 106. A suitable client machine is any suitable networked computer or data terminal as will be appreciated by one of ordinary skill in the art. The requests generally include a request to generate a document and the font in which the document is to be generated. The controller governs access to the printer devices 108, 110, 112 attached to the network. The controller includes a storage medium for storing rendered font images shown as 114 and described below. When the user requests that document be generated, the server sends the request either to a printer device to print the document in the font type selected or to the client machine to display the document in the font type selected.

Figure 2:
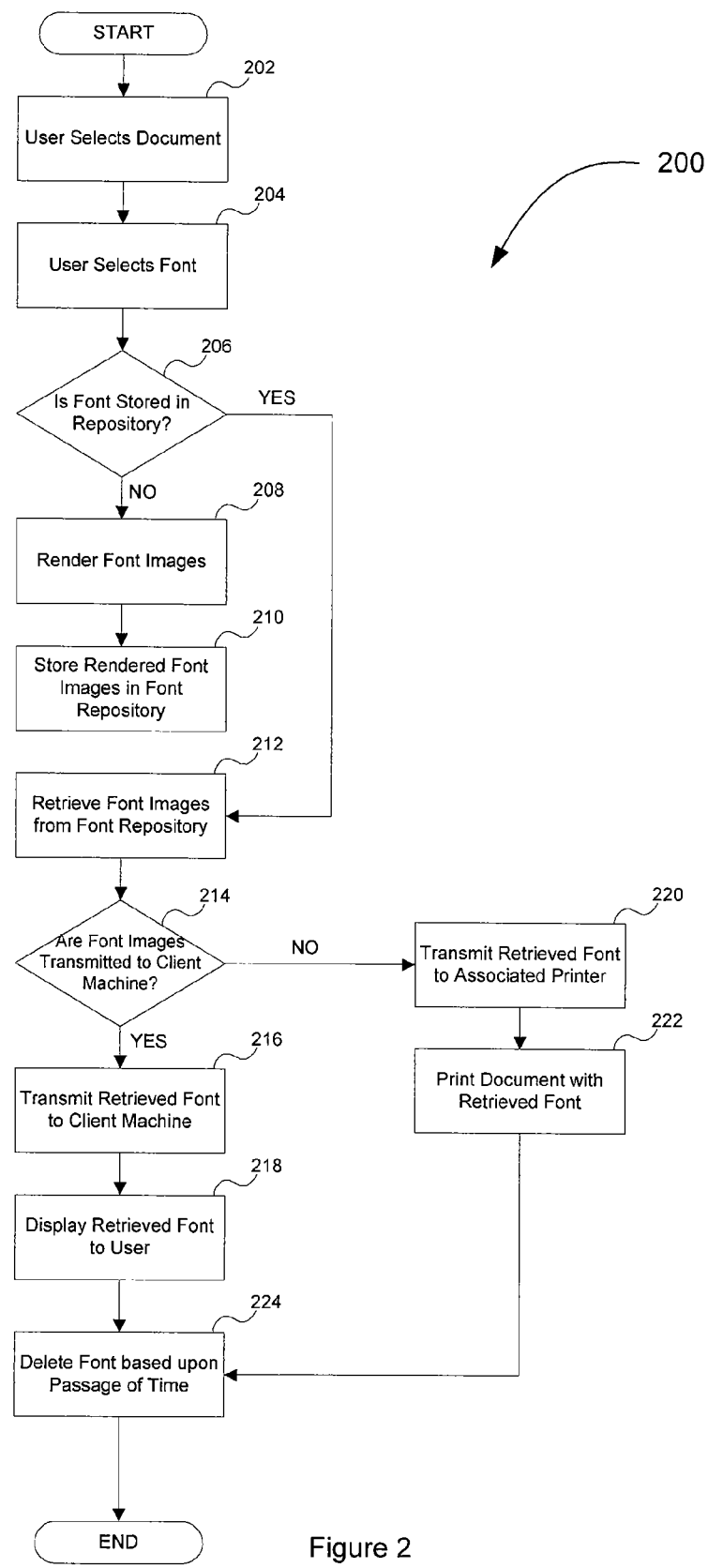
FIG. 2 is a flow chart illustrating the method according to the present invention.
Figure 3:
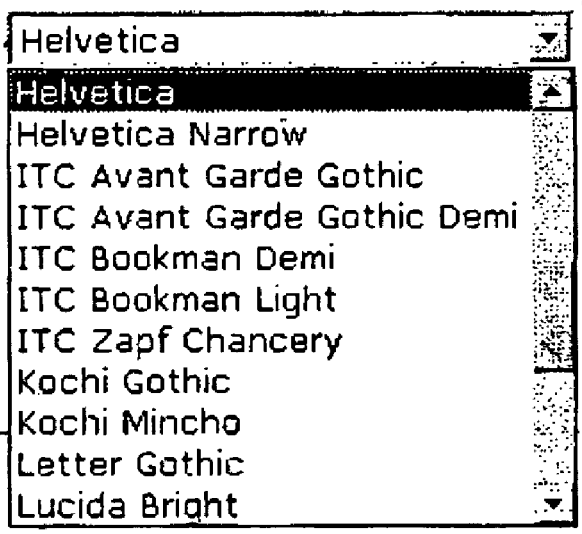
FIG. 3 is a sample template for selecting a font.

FIG. 2 shows a flow chart 200 illustrating the method according to the present invention. At 202, an associated user selects a document to be generated by any suitable means. Preferably, the user accesses a web browser on the client machine and selects the document. The web browser is any suitable browser known in the art, such as Internet Explorer, Microsoft Netscape, and Mozilla. At 204, the user selects a font from the fonts available to the user via any suitable means. Preferably, all the fonts available are displayed on any suitable display means, such as through the web browser on the client machine. FIG. 3 shows a sample template 300 for displaying the available fonts for selection by the user. The user selects the font type 302 and the font style 304. The user can preview the font chosen by selecting 306. At least a portion of the document with the selected font is then displayed by any suitable means. The user confirms the selection by selecting OK 308. The user may cancel the selection by selecting Cancel 310.

Figure 4:
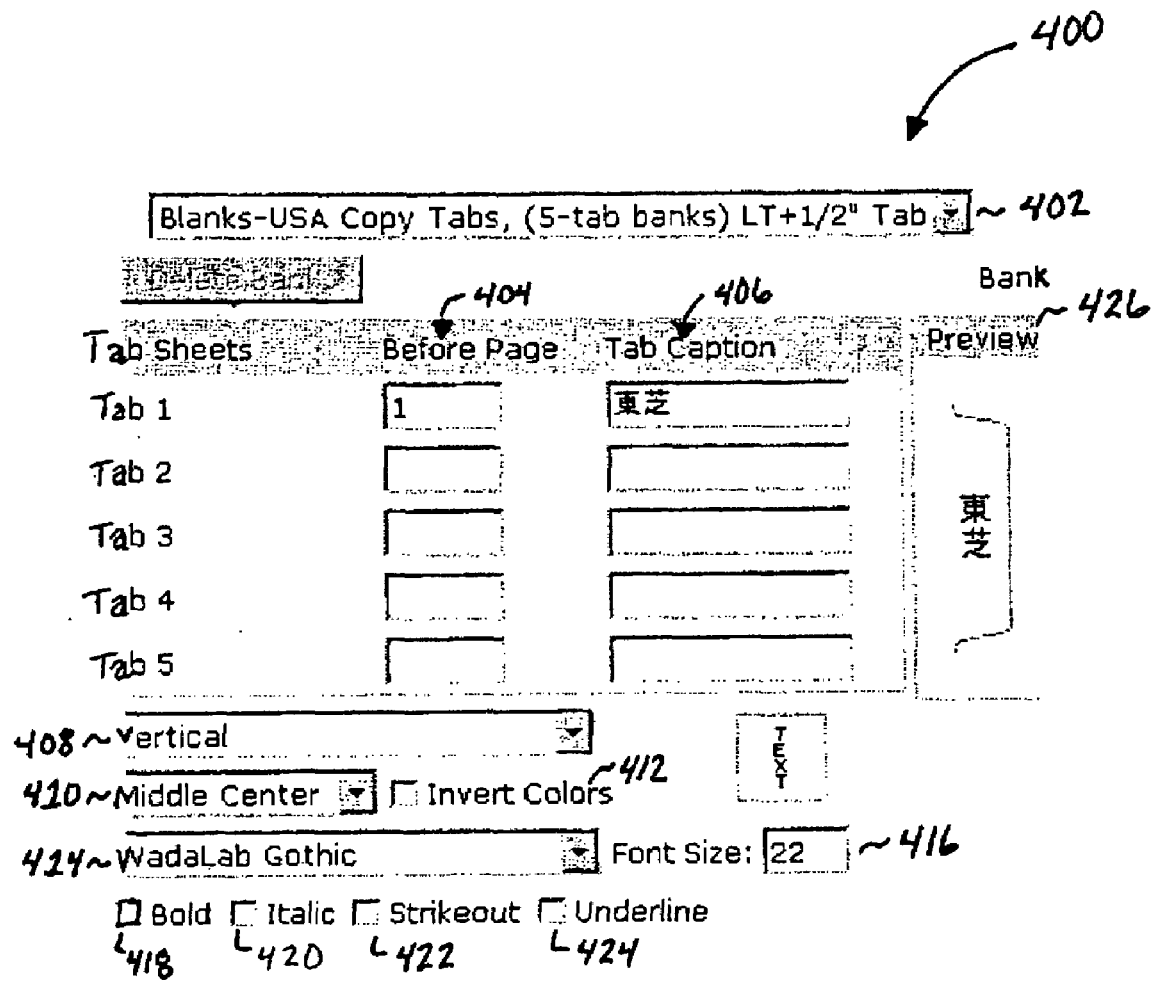
FIG. 4 is a sample template for selecting the parameters associated with the selected font.

In a preferred embodiment, the user selects the parameters associated with the font type selected, especially if the font is to be used for tab data. FIG. 4 shows a sample template 400 for selecting such parameters. The user selects the tab type at 402 from the available types. The available types are selected and displayed via any suitable means. The user then selects the location for each tab, such as before which page, at 404 and the caption for each tab at 406. The user selects location of the data on the tab at 408 and 410. The user can also select whether to invert colors by selecting the box 412. The user then selects the type of font at 414 and the size at 416. The user then selects the typeface of the font by selecting the Bold box 418, the Italic box 420, the Strikeout box 422, and the Underline box 424. The user may suitably select none, one, or more than one of these options. The user may preview the data with the selected parameters by selecting 426. At least a portion of the document with the selected font and parameters is then displayed by any suitable means.

Once the user has selected the font and any parameters associated with the font, flow proceeds to 206, wherein a determination is made if the selected font is stored in the font repository or storage medium 114 on the controller. If the selected font is not stored in the font repository, flow proceeds to 208 wherein the font images are rendered by any suitable means. The rendered font images are then stored in the font repository at 210. Preferably, the selected information about the font images are associated with and stored with the font images. Such information includes, but is not limited to, the date and time the font was stored, the parameters associated with the font, and the content of the font images. If this selected font is selected again by this user or another user, the system will search for the font in the font repository and retrieve the font for use. The system will not have to render the font images again, but will use the saved font images as rendered. Flow then proceeds to 212, wherein the font images are retrieved for use in the document.

If the selected font is stored in the font repository, then flow proceeds to 212 wherein the font is retrieved from the font repository for use in the document. A determination is then made at 214 if the retrieved font images are to be transmitted or communicated to the client machine. For a positive determination, the font images are then communicated or transmitted via any suitable means to at least one of the client machine as shown at 216. Once the font images are transmitted to the client machine, flow proceeds to 218 wherein the document is displayed with the selected font via any suitable means. A negative determination at step 214 indicates that the retrieved font images are to be transmitted or communicated to an associated printer device via any suitable means as shown at 220. When the font images are transmitted to a printer device the document is printed with the selected font via any suitable means as shown at 222.

In a preferred embodiment, the rendered font images are deleted from the font repository based upon a passage of time via any suitable means at step 224. In one embodiment, the font images are deleted if the font images are not used or selected within a predetermined time period, such as sixty days. The predetermined time period is suitably selected by selected user, such as an administrative user, via any suitable means. In another embodiment, the system includes a mechanism or means adapted for the user to delete any unwanted rendered fonts from the font repository via any suitable means. In a preferred embodiment, an administrative user may limit the ability of a user to only delete certain fonts, such as those fonts selected and stored at the request of such user.

As described hereinabove, the present invention solves many problems associated with previous type methods and implementations. However, it will be appreciated that various changes in the details, materials and arrangements of parts which have been herein described and illustrated in order to explain the nature of the invention may be made by those skilled in the are within the principle and scope of the invention will be expressed in the appended claims.

What is claimed is:

1. A networked font rendering system comprising:
   a web server for generating a web page image on a browser running on a networked workstation wherein the web page image includes data corresponding to document finishing options for at least one associated electronic document, including at least one tab option corresponding to at least one selectable font for use in connection with a selected document finishing option;
   means for receiving selection data via the web page, which selection data includes at least one selected finishing option and at least one font selection corresponding thereto;
   testing means for testing for availability of bitmapped font image data corresponding the at least one font selection;
   means for acquiring vector data representative of a vector based font corresponding to each font selection for which no availability of bitmapped font image data is indicated by the testing means;
   rendering means for rendering a portion of the vector based font to generate bitmapped font images corresponding to characters required for rending the selected finishing option;
   means for associating time stamp data corresponding to a time corresponding to the rendering of the vector based font;
   font storage means for storing the rendered bitmapped font images on a networked memory associatively with the time stamp data;
   means for deleting the rendered bitmapped font images in accordance with passage of a selected duration relative to the time stamp data; and
   communication means for selectively communicating the font images from the font storage means and the electronic document to at least one networked printer to generate document print data in accordance with a request from networked workstation so as to generate a printout including a rendering of the electronic document and a rendering of each selected finishing option from the font images.

2. The networked font rendering system of claim 1 further comprising:
   means for prompting an associated user for selection data to select a font;
   means for receiving user selection data resultant from the prompt of the user for the font; and
   means for requesting the font in accordance with the user selection data.

3. The networked font rendering system of claim 2 wherein the means for prompting the associated user for selection data to select the font includes means for displaying selected information about each font which is available for selection.

4. The networked font rendering system of claim 3 wherein the means for displaying selected information about each font includes at least one of font type, font size, and font style for each font.

5. The networked font rendering system of claim 3 wherein the selection data includes at least one of font type, font size, font style, tab information, location of font within document, and font format.

6. The networked font rendering system of claim 1 further comprising updating means for updating font storage means for the selected font.

7. The networked font rendering system of claim 6 further comprising means for deleting the selected font from the font storage means upon at least one of a predetermined time interval in which the font has not been selected and a request received from an associated user.

8. A method for rendering fonts in a networked system comprising the steps of:

generating a web page image, via a web server, on a browser running on a networked workstation wherein the web page image includes data corresponding to document finishing options for at least one associated electronic document including at least one of pagination options and page numbering options, and font selection options corresponding to at least one selectable font for use in connection with a selected document finishing option;

receiving selection data via the web page, which selection data includes at least one selected finishing option and at least one font selection corresponding thereto;

testing for availability of bitmapped font image data corresponding the at least one font selection;

acquiring vector data representative of a vector based font corresponding to each font selection for which no availability of bitmapped font image data is indicated by the testing;

rendering at least a portion of the vector based font to generate bitmapped font images corresponding to characters required for rendering the selected finishing option;

associating time stamp data corresponding to a time corresponding to the rendering of the vector based font;

storing the rendered bitmapped font images on a networked memory associatively with the time stamp data;

deleting the rendered bitmapped font images in accordance with passage of a selected duration relative to the time stamp data; and selectively communicating the font images from the memory and the electronic document to at least one networked printer to generate document print data in accordance with a request from networked workstation so as to generate a printout including a rendering of the electronic document and a rendering of each selected finishing option from the font images.

9. The method for rendering fonts of claim 8 further comprising:

prompting an associated user for selection data to select a font;

receiving user selection data resultant from the prompt of the user for the font; and requesting the font in accordance with the user selection data.

10. The method for rendering fonts of claim 9 wherein step of prompting the associated user for selection data to select the font includes displaying selected information about each font which is available for selection.

11. The method for rendering fonts of claim 10 wherein the selected information displayed about each font includes at least one of font type, font size, and font style.

12. The method of rendering fonts of claim 9 wherein the selection data includes at least one of font type, font size, font style, tab information, location of font within document, and font format.

13. The method of rendering fonts of claim 8 further comprising the step of updating the memory for the selected font.

14. The method of rendering fonts of claim 13 further comprising the steps of deleting the selected font from the memory upon at least one of a predetermined time interval in which the font has not been selected and a request received from an associated user.

* * * * *

UNITED STATES PATENT AND TRADEMARK OFFICE
CERTIFICATE OF CORRECTION

| | | |
|---|---|---|
| PATENT NO. | : 7,609,398 B2 | Page 1 of 3 |
| APPLICATION NO. | : 10/675136 | |
| DATED | : October 27, 2009 | |
| INVENTOR(S) | : Katie Kuwata, Truc Nguyen and William Su | |

It is certified that error appears in the above-identified patent and that said Letters Patent is hereby corrected as shown below:

In the Drawings, please replace Fig. 3 with the following:

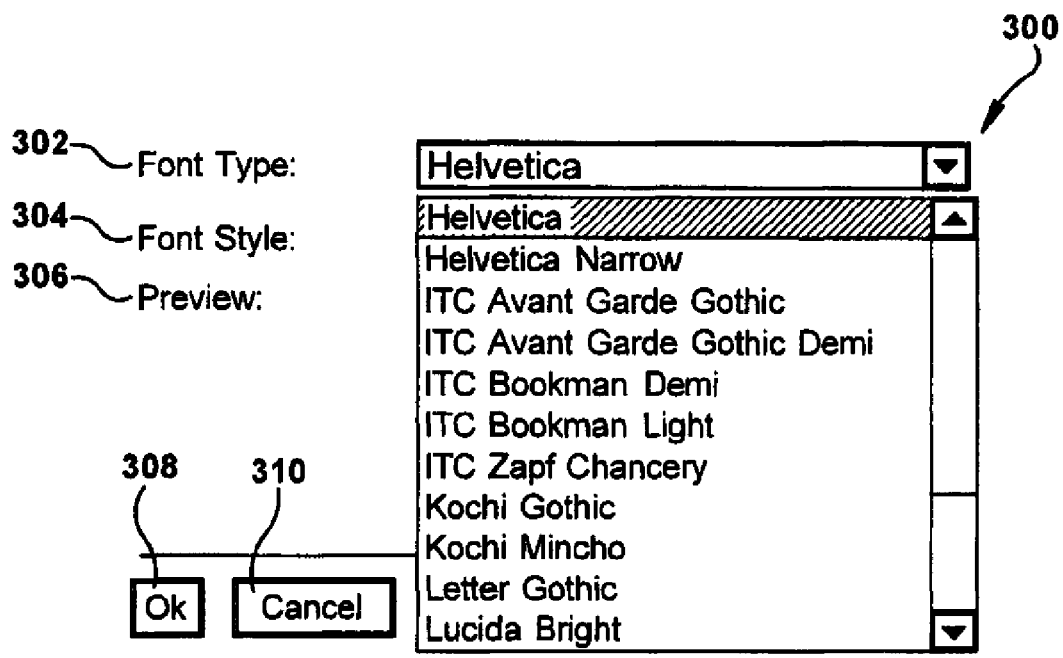

Figure 3

UNITED STATES PATENT AND TRADEMARK OFFICE
CERTIFICATE OF CORRECTION

| | | |
|---|---|---|
| PATENT NO. | : 7,609,398 B2 | Page 2 of 3 |
| APPLICATION NO. | : 10/675136 | |
| DATED | : October 27, 2009 | |
| INVENTOR(S) | : Katie Kuwata, Truc Nguyen and William Su | |

It is certified that error appears in the above-identified patent and that said Letters Patent is hereby corrected as shown below:

In the Drawings, please replace Fig. 4 with the following:

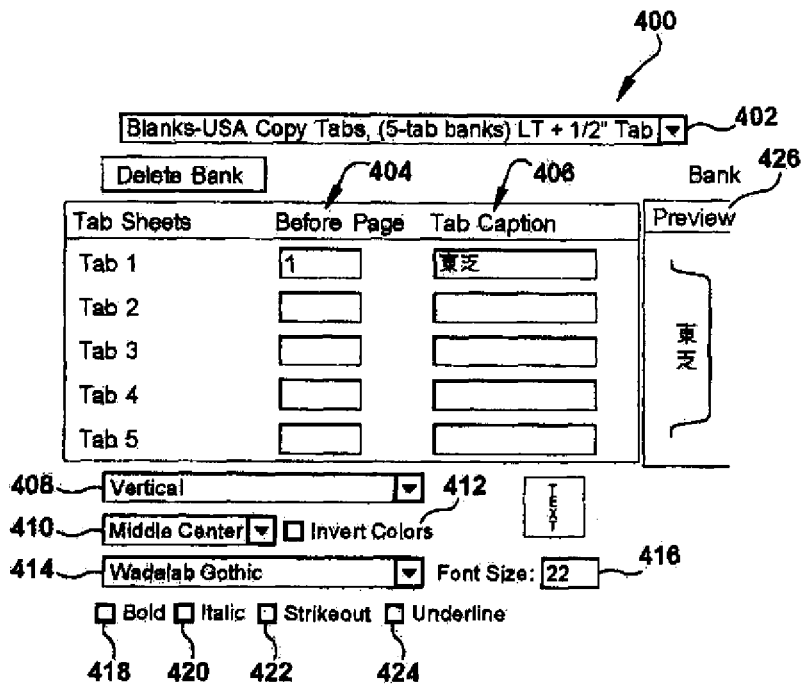

Figure 4

UNITED STATES PATENT AND TRADEMARK OFFICE
CERTIFICATE OF CORRECTION

PATENT NO. : 7,609,398 B2
APPLICATION NO. : 10/675136
DATED : October 27, 2009
INVENTOR(S) : Katie Kuwata, Truc Nguyen and William Su It is certified that error appears in the above-identified patent and that said Letters Patent is hereby corrected as shown below:

In Claim 1, Column 4, Line 29, please replace "corresponding the at least one font selection" with --corresponding to the at least one font selection--.

In Claim 1, Column 4, Line 36, please replace "characters required for rending the selected finishing" with --characters required for rendering the selected finishing--.

In Claim 1, Column 4, Line 51, please replace "request from networked workstation" with --request from the networked workstation--.

In Claim 8, Column 5, Lines 31-32, please replace "corresponding the at least one font selection" with --corresponding to the at least one font selection--.

In Claim 8, Column 6, Line 11, please replace "accordance with a request from networked workstation" with --accordance with a request from the networked workstation--.

In Claim 10, Column 6, Line 23, please replace "The method for rendering fonts of claim 9 wherein step" with --The method for rendering fonts of claim 9 wherein the step--.

Signed and Sealed this

Fifteenth Day of December, 2009

David J. Kappos
*Director of the United States Patent and Trademark Office*